US012698833B2

(12) United States Patent
Carbaugh et al.

(10) Patent No.: US 12,698,833 B2
(45) Date of Patent: Aug. 4, 2026

(54) VALVE ASSEMBLY AND PISTON WITH DOUBLE O-RING INTERFACE AND RELIEF PASSAGE

(71) Applicant: Bendix Commercial Vehicle Systems LLC, Avon, OH (US)

(72) Inventors: Kristina Carbaugh, Lakewood, OH (US); Tarah L. Peabody, Elyria, OH (US); Joel Alvarado, General Escobedo (MX); Mark B. Rottinger, North Ridgeville, OH (US); Brian J. Riley, New London, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 293 days.

(21) Appl. No.: 18/444,345

(22) Filed: Feb. 16, 2024

(65) Prior Publication Data

US 2025/0264160 A1      Aug. 21, 2025

(51) Int. Cl.
| | |
|---|---|
| *F16K 1/36* | (2006.01) |
| *B60T 15/04* | (2006.01) |
| *F16K 1/44* | (2006.01) |
| *F16K 1/46* | (2006.01) |
| *F16K 31/122* | (2006.01) |
| *F16K 39/02* | (2006.01) |

(52) U.S. Cl.
CPC .............. *F16K 1/36* (2013.01); *B60T 15/043* (2013.01); *F16K 1/46* (2013.01); *F16K 31/1221* (2013.01); *F16K 39/02* (2013.01); *F16K 1/446* (2013.01); *F16K 2200/401* (2021.08)

(58) Field of Classification Search
CPC ... F16K 1/36; F16K 1/46; F16K 1/446; F16K 31/1221; F16K 39/02; F16K 2200/401; B60T 15/043
See application file for complete search history.

(56) References Cited

U.S. PATENT DOCUMENTS

| | | | | |
|---|---|---|---|---|
| 2,615,769 | A | * | 10/1952 | Barnes ........................ F16J 1/02 277/457 |
| 2,892,645 | A | * | 6/1959 | Tydeman ................. F16J 15/48 277/928 |

(Continued)

OTHER PUBLICATIONS

Bendix Service Data, "Bendix E-6 & E-10 Dual Brake Valves", SD-03-817, Jun. 2010 (6 pages).

(Continued)

*Primary Examiner* — Eric Keasel
(74) *Attorney, Agent, or Firm* — Crowell & Moring LLP

(57) ABSTRACT

A valve assembly includes a housing having an interior wall defining a chamber having a longitudinal axis. A piston is disposed in the chamber and is movable between first and second positions along the longitudinal axis, wherein the piston includes a piston head. The piston head has opposite first and second sides, longitudinally spaced first and second peripheral grooves disposed between the first and second sides, wherein the first and second grooves define a space therebetween, and a relief passage extending radially inwardly from the first groove and communicating between the space and the first side of the piston. Longitudinally spaced first and second O-rings are disposed in the first and second grooves and engage the interior wall.

18 Claims, 12 Drawing Sheets

(56) References Cited

U.S. PATENT DOCUMENTS

| 2,914,368 | A | * | 11/1959 | Farmer | F16J 15/56 |
| | | | | | 277/457 |
| 4,795,173 | A | * | 1/1989 | Osborne | F16J 15/56 |
| | | | | | 277/457 |
| 10,195,350 | B2 | | 2/2019 | Gibler et al. | |
| 11,512,780 | B2 | * | 11/2022 | Gregoire | F16K 7/17 |

OTHER PUBLICATIONS

Bendix Service Data, "Bendix R-12DC Relay Valve with Biased Double-Check", SD-03-1068, Apr. 2016 (8 pages).

\* cited by examiner

FIG. 7

VALVE ASSEMBLY AND PISTON WITH DOUBLE O-RING INTERFACE AND RELIEF PASSAGE

BACKGROUND

Various systems may incorporate a pneumatic valve configured with a guide piston, including for example and without limitation relay valves and foot brake modules. Such systems may be incorporated as a component of a braking system of a vehicle, such as a tractor/truck that is capable of towing a trailer. Typically, such systems include a piston, which actuates a valve. The piston may be subjected to various forces or moments during operation causing the piston to tilt, which may subject the piston, valve and/or housing to uneven wear.

BRIEF DESCRIPTION OF THE DRAWINGS

FIG. 7 is an enlarged view of a portion of the foot brake module assembly of FIG. 6.

SUMMARY

In one aspect, one embodiment of a valve assembly includes a housing having an interior wall defining a chamber having a longitudinal axis. A piston is disposed in the chamber and is movable between first and second positions along the longitudinal axis, wherein the piston includes a piston head. The piston head has opposite first and second sides, longitudinally spaced first and second peripheral grooves disposed between the first and second sides, wherein the first and second grooves define a space therebetween, and a relief passage extending radially inwardly from the first groove and communicating between the space and the first side of the piston. Longitudinally spaced first and second O-rings are disposed in the first and second grooves and engage the interior wall.

In another aspect, one embodiment of a piston includes a piston head having opposite first and second sides and longitudinally spaced first and second peripheral grooves disposed between the first and second sides and defining a space therebetween. A relief passage extends radially inwardly from the first groove and communicates between the space and the first side of the piston. Longitudinally spaced first and second are O-rings disposed in the first and second grooves and engaging the interior wall.

In another aspect, one embodiment of a foot brake assembly includes a valve assembly having a piston with a relief passage, an air supply port, and an air delivery port. The piston is movable between first and second positions to allow air to flow from the air supply port to the air delivery port. In one embodiment, the piston has a supply pressure applied to the first side, wherein the relief passage is in communication with the first side.

In another aspect, one embodiment of a relay valve assembly includes a piston with a relief passage. The piston is moveable relative to the housing between an applied position and a release position. The piston includes a seat engaged with a valve when the piston is in the applied position, and wherein the seat is disengaged from the valve when the piston is in the release position.

Various methods of using the valve assembly and piston are also disclosed.

The various embodiments of the valve assembly, piston, foot brake and relay valve provide significant advantages relative to other valve assemblies and pistons. For example and without limitation, the first and second O-rings resist any tilting of the piston by providing a counter moment. At the same time, the relief passage behind one of the O-rings ensures that air is not trapped between the O-rings, but rather allows the air to escape past the selected O-ring. In one embodiment, the relief passage communicates with the supply side of the piston.

Other embodiments are possible, and each of the embodiments can be used alone or together in combination.

DETAILED DESCRIPTION

Figure 1:
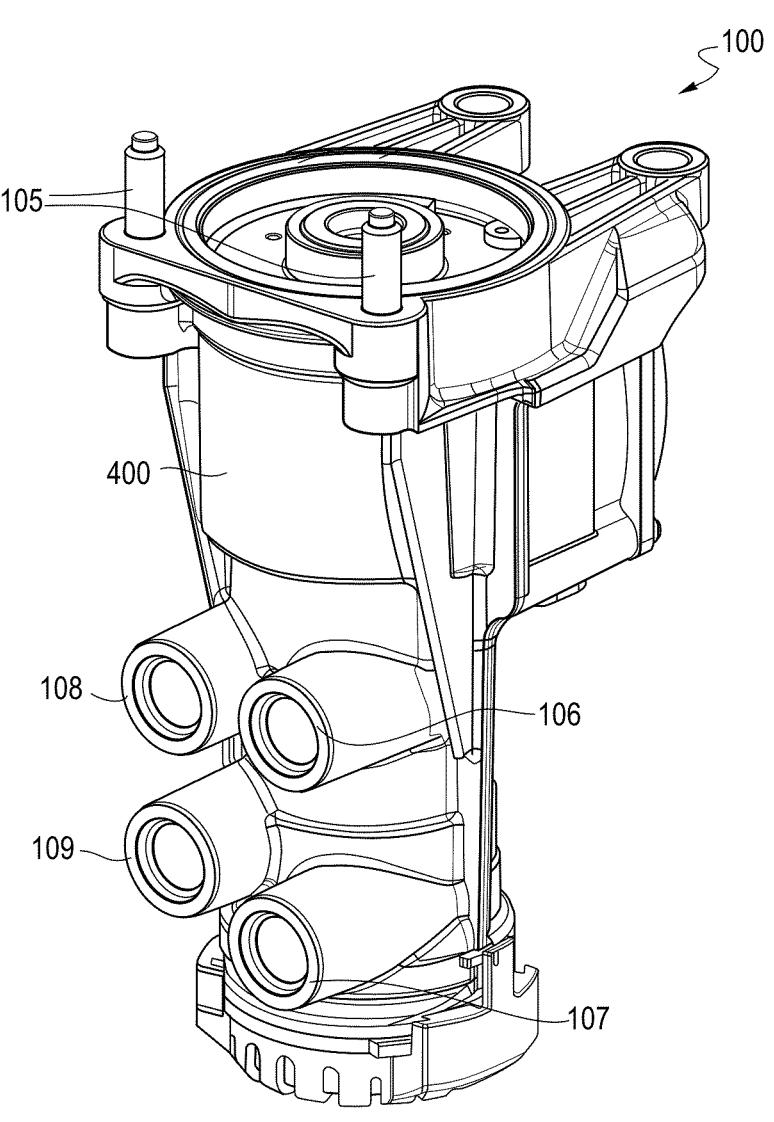
FIG. 1 is a perspective view of one embodiment of a foot brake module assembly.
Figure 2:
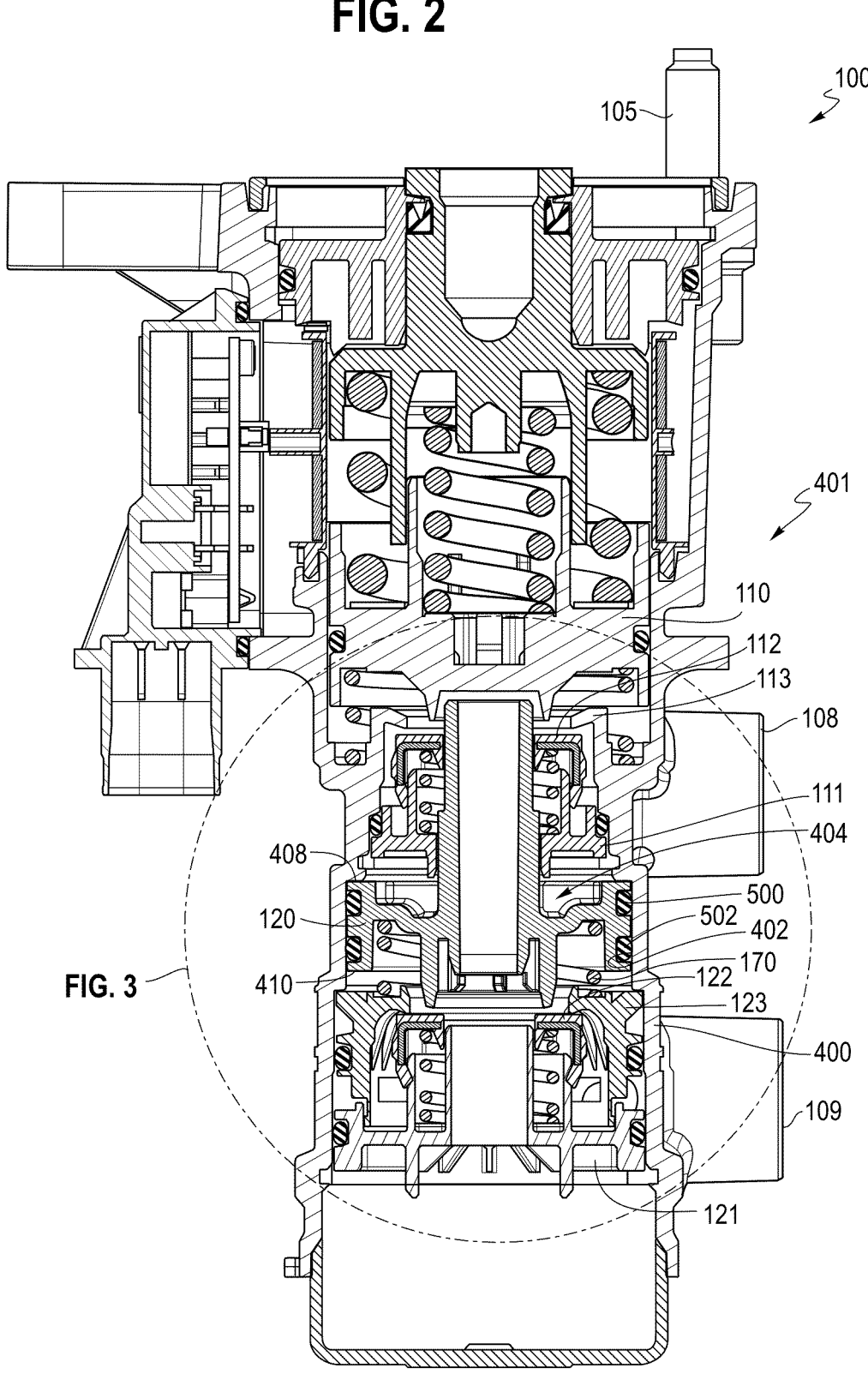
FIG. 2 is a cross-sectional view of the foot brake module assembly of FIG. 1 when a foot brake pedal is not pressed and there is no air flow in primary and secondary circuits of the foot brake module assembly.
Figure 3:
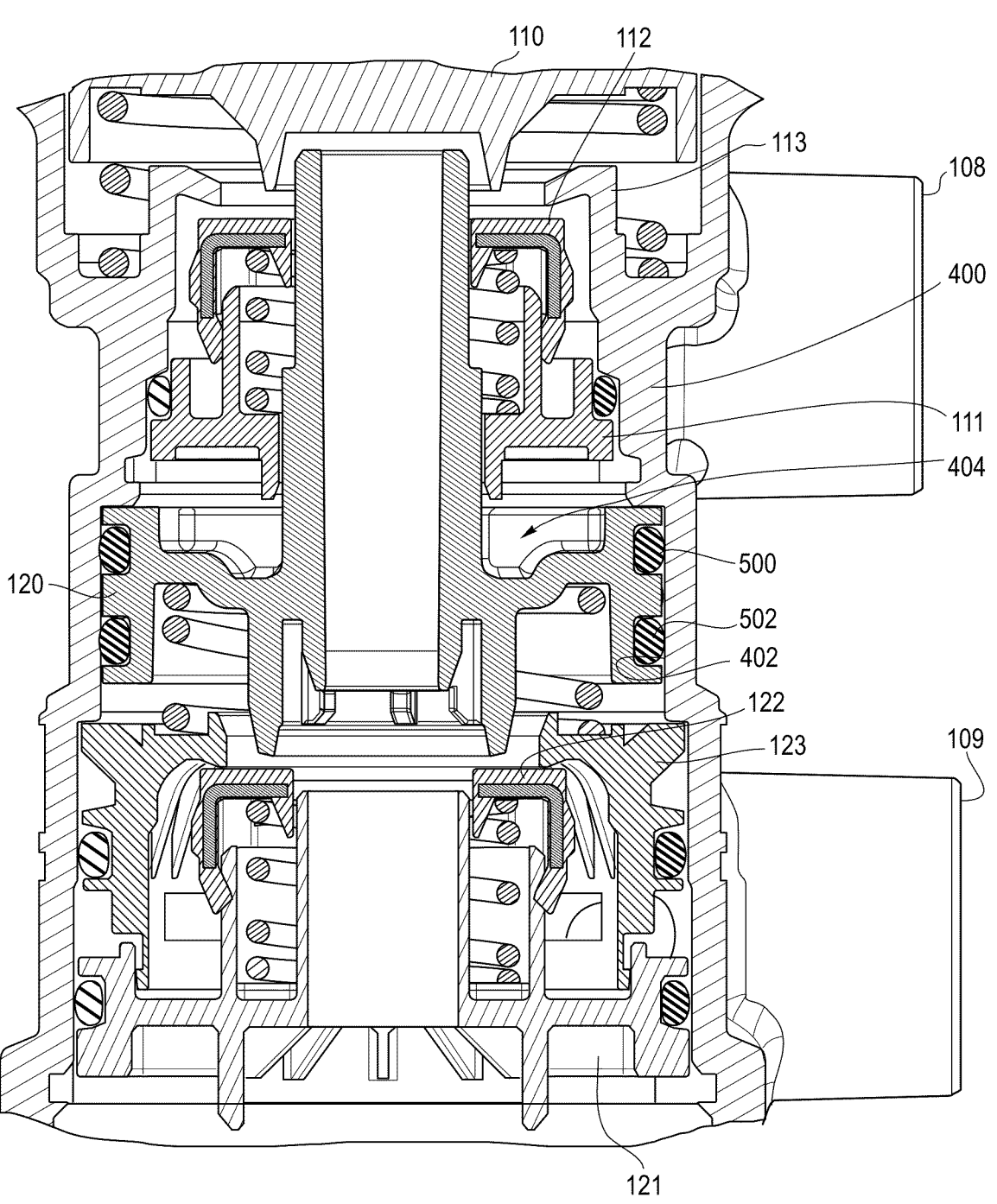
FIG. 3 is an enlarged view of a portion of the foot brake module assembly of FIG. 2.

Referring to FIG. 1, a foot brake module (FBM) assembly 100 (sometimes referred to herein as a "foot brake assembly" or just a "foot brake module (FBM)" may be used in any suitable vehicle, such as, but not limited to, a tractor/truck that is capable of towing a trailer. The FBM assembly 100 of this embodiment may include mounts 105 for a brake pedal (not shown), primary and secondary supply ports 106, 107, and primary and secondary delivery ports 108, 109. FIG. 2 is a cross-sectional view of the FBM assembly 100, and FIG. 3 is an enlarged view of a portion of the FBM assembly 100. As shown in FIG. 2, in this embodiment, the first circuit of the FBM assembly 100 includes a primary piston 110 positioned in a primary guide sleeve 111, a primary valve collar 112, and a primary valve seat 113. Similarly, the second circuit of the FBM assembly 100 comprises a secondary (relay) piston 120 positioned in a secondary guide sleeve 121, a secondary valve collar 122, and a secondary valve seat 123.

In one embodiment, as shown in FIGS. 2-7, the FBM is configured as a valve assembly 401 having a housing 400 with an interior wall 402 defining a chamber 404. The chamber 404 extends along a longitudinal axis 406. A piston 120 is moveably disposed in the chamber 404 and is movable between first and second positions along the longitudinal axis 406 as further explained below. The piston 120 divides the chamber 404 between first and second cavities.

Figure 16:
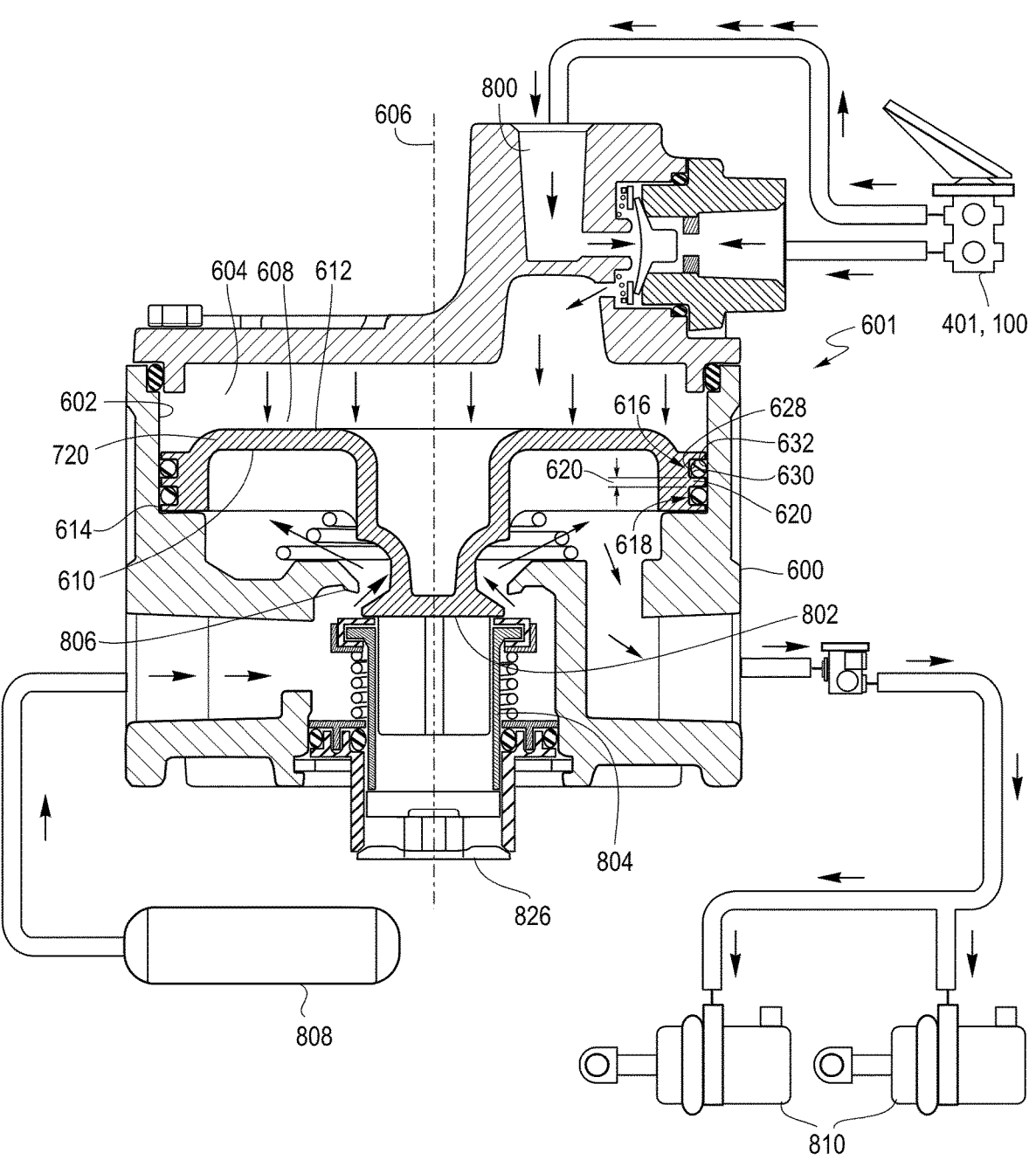
FIG. 16 is a schematic illustration of a relay valve assembly in an applied position.
Figure 17:
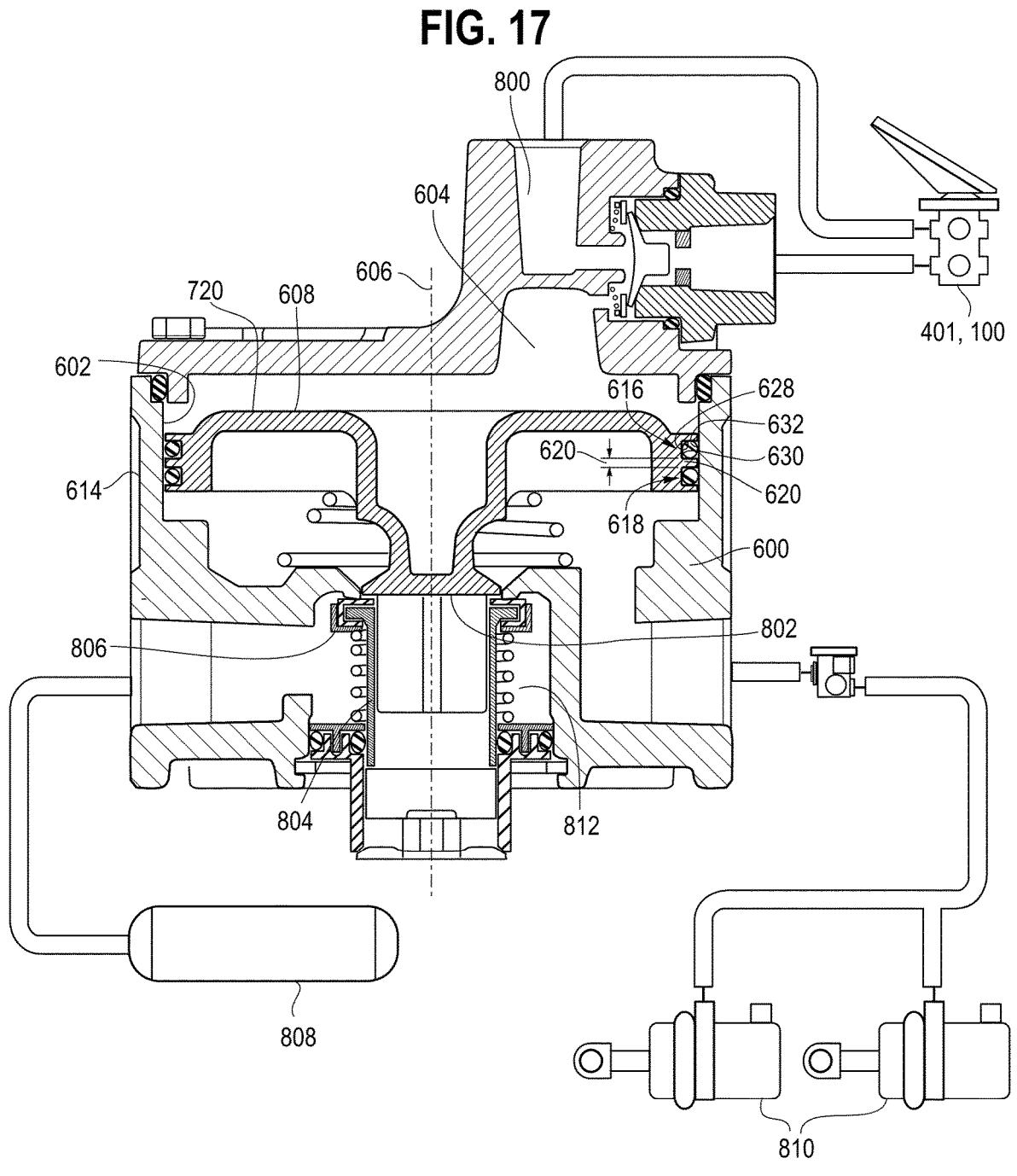
FIG. 17 is a schematic illustration of a relay valve assembly in a balance position.
Figure 18:
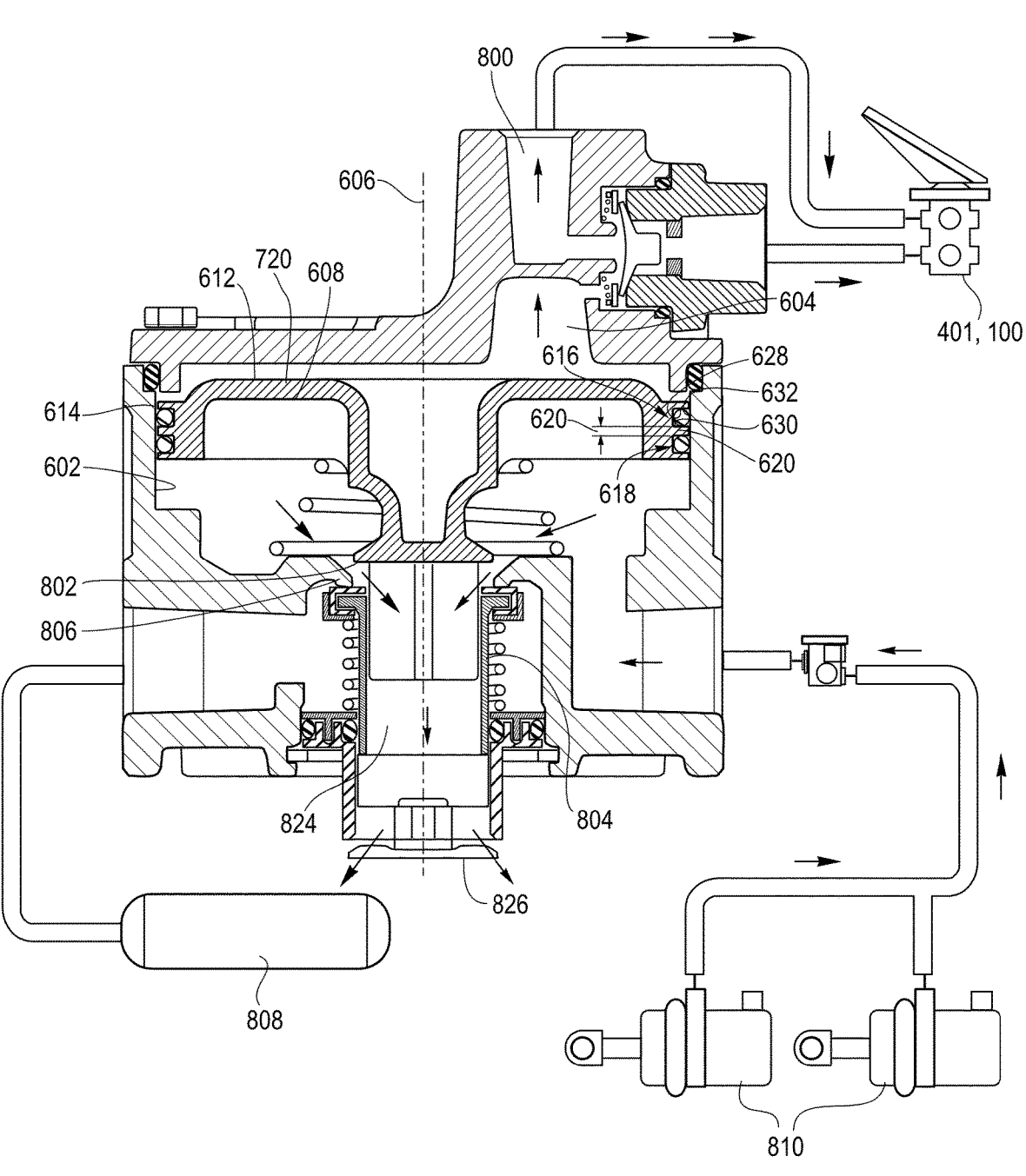
FIG. 18 is a schematic illustration of a relay valve assembly in an exhaust position.

In another embodiment, shown in FIGS. 16-18, a relay valve assembly 601 is shown as including a housing 600 having an interior wall 602 defining a chamber 604. The chamber 604 extends along a longitudinal axis 606. A piston 720 is moveably disposed in the chamber 604 and is movable between first and second positions (e.g., applied, balanced and exhaust/relief positions) along the longitudinal axis 606 as further disclosed below.

Referring to FIGS. 8-18, the piston 120, 720 includes a piston head 412, 612 having opposite first and second sides 408, 410, 608, 610. The piston head 412, 612 further includes a peripheral side edge 414, 614, defined as a circumferential surface in one embodiment. First and second peripheral and circumferential grooves 416, 418, 616, 618 are longitudinally spaced along the longitudinal axis 406, 606 and are disposed between the first and second sides 408, 410, 608, 610. The first and second grooves 416, 418, 616, 618 define a space 420, 620 therebetween, or are spaced apart, for example by a circumferential rib 422, 622. In operation, the rib 422, 622 does not engage the interior wall 402, 602, thereby defining the space 420, 620 between the grooves.

Figure 8:
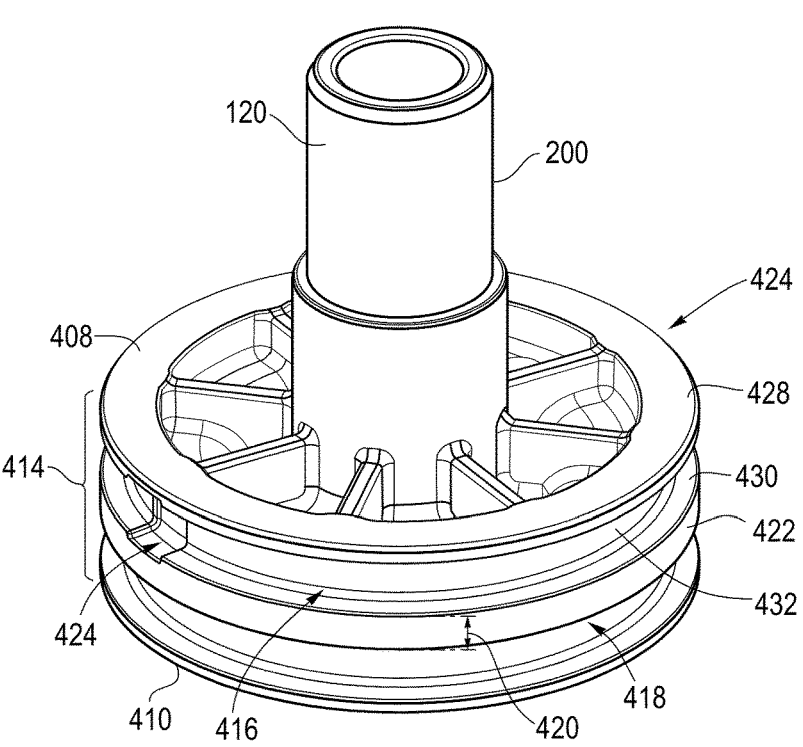
FIG. 8 is a perspective view of one embodiment of a piston with a relief passage.
Figure 9:
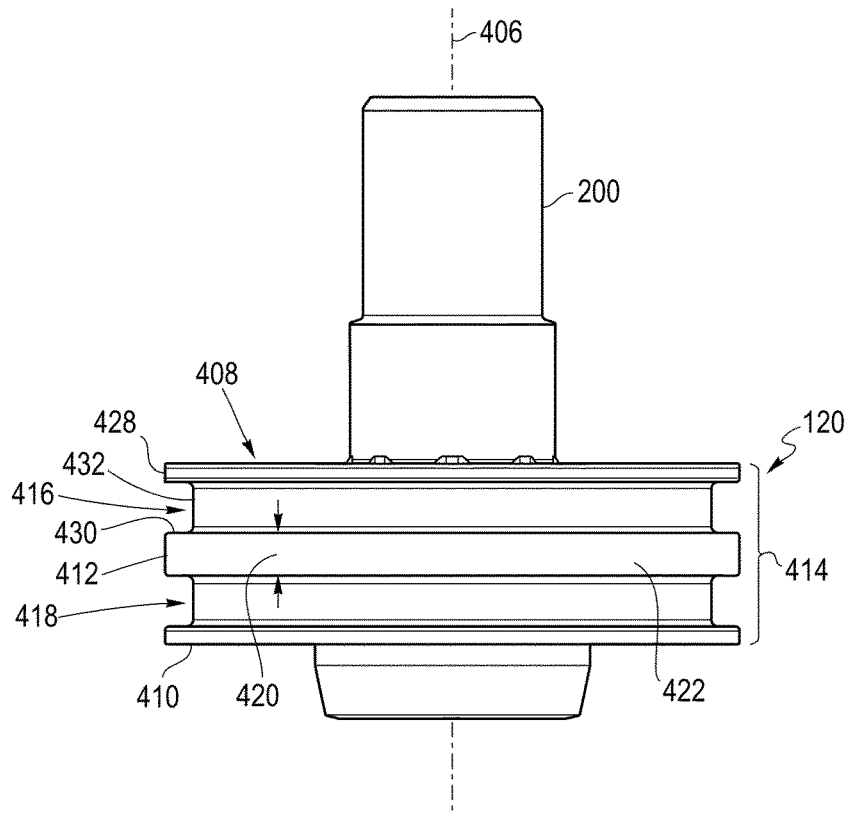
FIG. 9 is a side view of the piston shown in FIG. 8.
Figure 10:
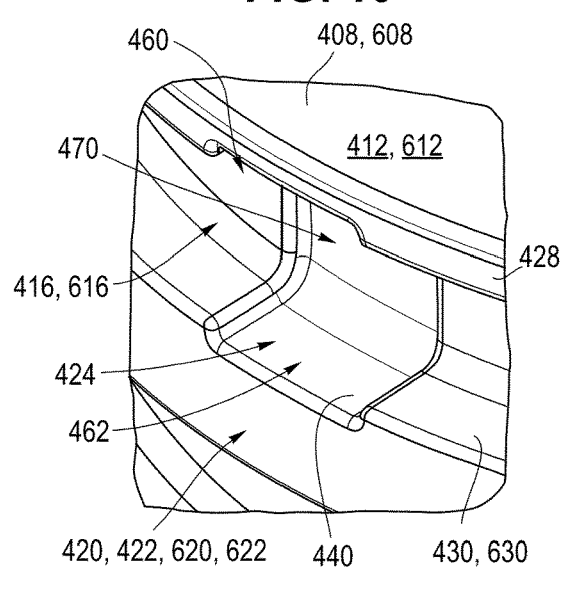
FIG. 10 is a partial, enlarged perspective view of the piston showing one embodiment of a relief passage.
Figure 11:
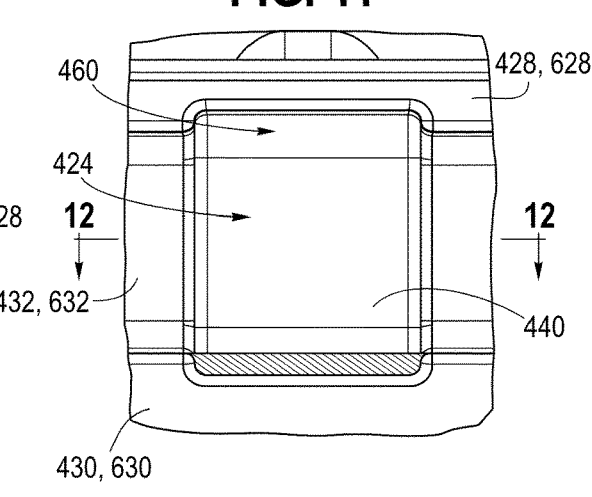
FIG. 11 is partial, enlarged side view of the piston and relief passage shown in FIG. 10.

A relief passage 424, 426, shown in FIGS. 8 and 10-15 and otherwise referred to as a vent, extends radially inwardly from the first groove 416, 616 and is in fluid communication between the space 420, 620 and the first side 408, 608 of the piston head 412, 612. In other embodiments, the relief passage may be instead be formed in, or behind (i.e., radially inwardly from), the second groove 418, 618. The term "fluid" refers to a gas or liquid. As shown in FIG. 8, the piston 120, 720 may be configured with a plurality of relief passages 424 in or behind the groove 416, 616. The term "plurality" refers to two or more. In one embodiment, the piston 120, 720 includes a pair of relief passages 424, 426 circumferentially spaced, for example and without limitation at 180 degrees, on the first groove 416, 616. It should be understood that a single relief passage or more than two relief passages, may be suitable. In addition, the relief passage(s) may be configured with different circumferential lengths, or have deeper or more shallow undercuts, so as to optimize the cross-sectional flow area and ensure proper air flow for adequate venting and avoiding any trapped pressurized air, It should be understood that either or both relief passages 424, 426 may be formed in either or both of the grooves 416, 616.

Figure 12:
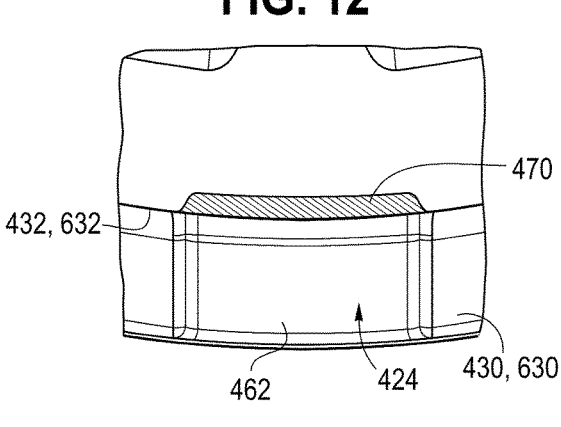
FIG. 12 is a cross-sectional view of the piston and relief passage taken along line 12-12 in FIG. 11.
Figure 13:
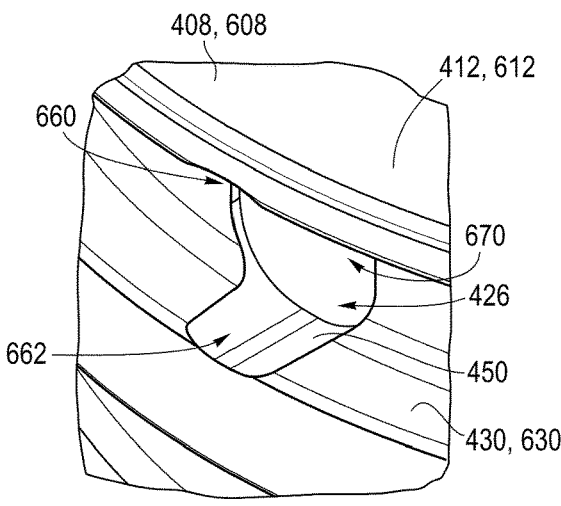
FIG. 13 is a partial, enlarged perspective view of the piston showing another embodiment of a relief passage.
Figure 14:
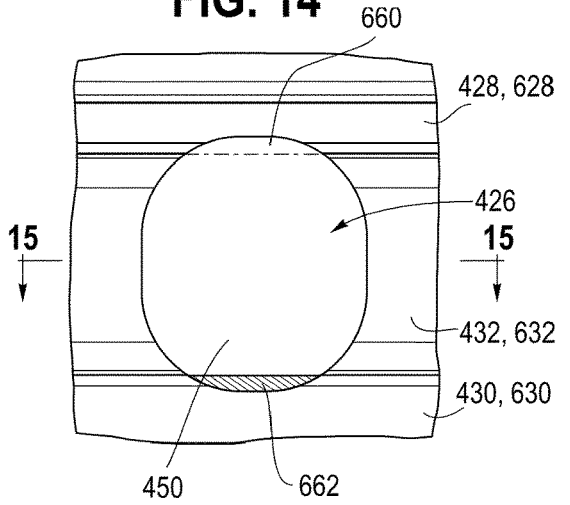
FIG. 14 is partial, enlarged side view of the piston and relief passage shown in FIG. 13.
Figure 15:
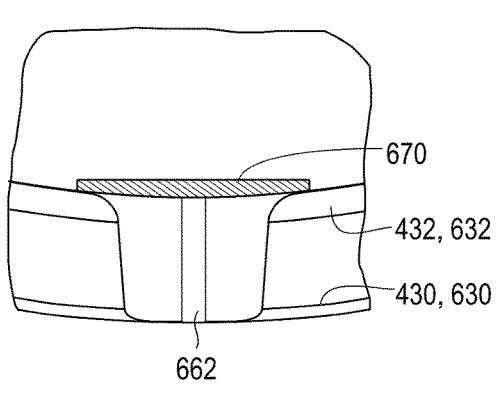
FIG. 15 is a cross-sectional view of the piston and relief passage taken along line 15-15 in FIG. 14.

The first groove 416, 616 may be defined by an upper wall 428, 628 longitudinally spaced from a lower wall 430, 630 and a circumferential side wall 432, 632. In one embodiment, the relief passage 424, 426 is defined by a continuous undercut 440, 450 formed in the upper and lower walls 428, 628, 430, 630 and the side wall 432, 632. As a result of the undercut 440, 450, first and second openings 460, 462, 660, 662 are defined in the upper and lower walls 428, 628, 430, 630 at the circumferential periphery of the piston head 412, 612. In one embodiment, shown in FIGS. 10 and 11, the first and second openings 460, 462 have a rectangular cross-section, with a linear surface. In another embodiment, shown in FIGS. 13 and 14, the first and second openings 660, 662 have a curved surface and a circular segment cross-section. It should be understood that the openings may be configured with any suitable shape, preferably without sharp corners or edges. The first and second openings 460, 462, 660, 662 may have first and second cross-sectional areas between 0.20 mm$^2$ and 2.00 mm$^2$. Referring to FIGS. 12 and 15, the undercut 470, 670 in the side wall 432, 632, which may have a linear surface (FIG. 15) or curved surface (FIG. 12) has a cross-sectional area of between 0.20 mm$^2$ and 2.00 mm$^2$. The first and second openings 460, 462, 660, 662 communicate (i.e., are in fluid communication) with the chamber 404, 604 and space 420, 620 respectively.

Referring to FIGS. 2-9, the piston 120 includes a shaft 200 extending from the first side 408 of the piston head 412, wherein the shaft is positioned in a guide sleeve 111. Longitudinally spaced first and second O-rings 500, 502 are disposed in the first and second grooves 416, 418 and engage the interior wall 402 of the chamber 404. The second O-ring 502 seals the piston against the interior wall of the chamber. The first O-ring 500 acts as a guide to counter any moments applied to the piston 120 and prevent tilting thereof. The first O-ring does not act as a seal against the interior wall 402, 602 of the chamber 404, 604 due to the relief passage(s) 424, 426, which act as a vent between the space 420 between the O-rings 500, 502 and the chamber 404 on the first side 408 of the piston 120. In this way, air is prevented from being trapped between the O-rings 500, 502 and thereby creating unnecessary friction. Instead, the air may pass through the relief passage 424, 426, or vent, and into the chamber 404. The chamber may define the primary delivery air passage, and may be pressurized or have a pressure greater than the pressure on the other side of the piston 120. As shown in FIGS. 2-14, the relief passage 424, 426, or vent, is positioned radially inwardly from the groove 416, 616 and inner diameter of the O-ring 500 disposed therein. In other embodiments, the primary piston 110 may also be configured with a double O-ring interface, including a vent between the space defined between the O-rings and a chamber on the other side of one of the O-rings. It should be understood that in various applications, the space between the O-rings may be vented to one or the other of the sides of the piston past either the first or second O-ring depending on the application and the system parameters, including for example the pressures acting on the piston.

In the configuration shown in FIGS. 2 and 3, the foot brake pedal is not pressed and there is no air flow in primary and secondary circuits. That is, in the primary circuit, the primary valve collar 112 is pressed against the primary valve seat 113, preventing air flow from the primary supply port 106 to the primary delivery port 108. Similarly, in the secondary circuit, the secondary valve collar 122 is pressed against the secondary valve seat 123, preventing air flow from the secondary supply port 107 to the primary delivery port 109.

Figure 4:
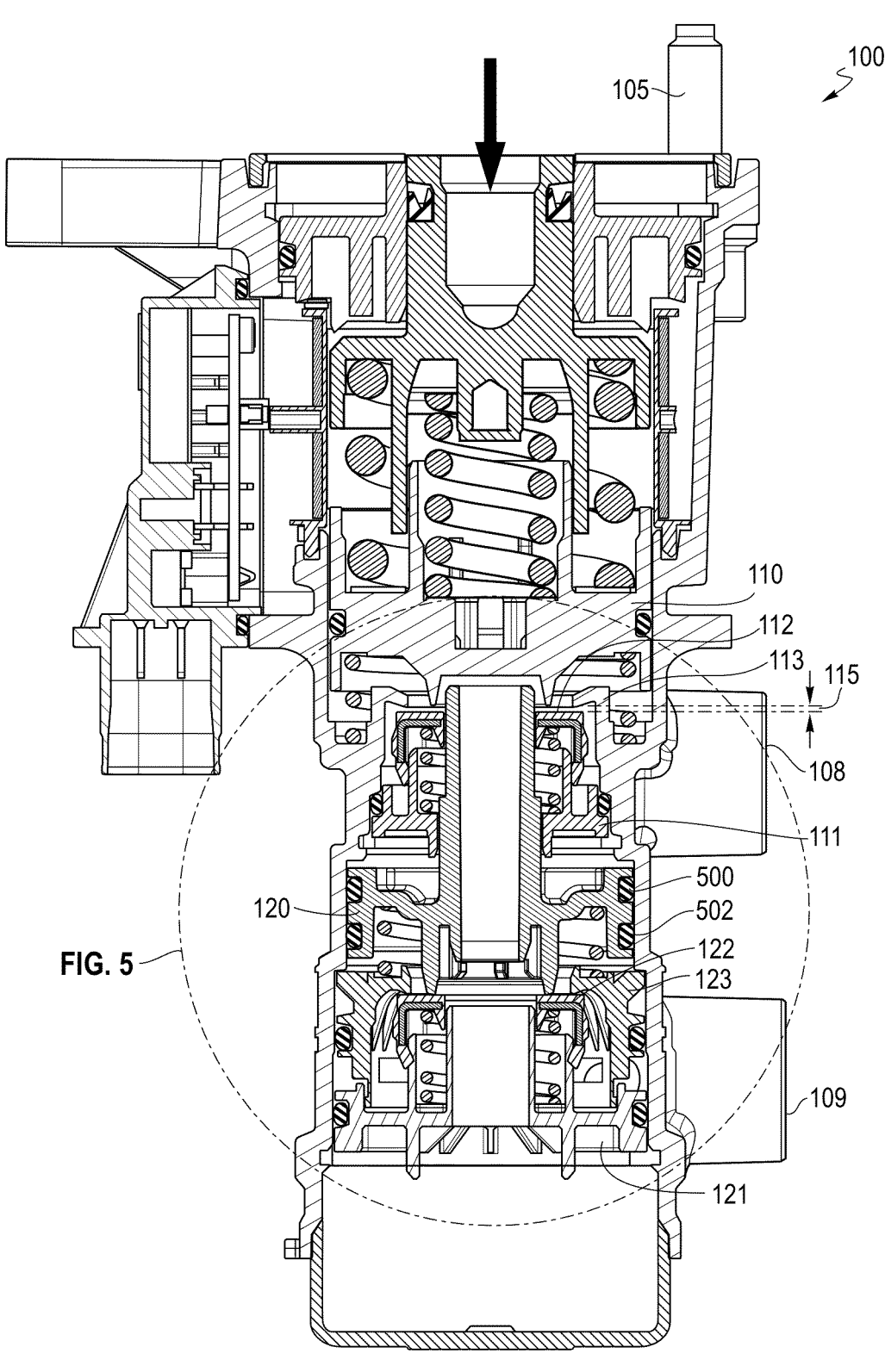
FIG. 4 is a cross-sectional view of FIG. 1 when the foot brake pedal is pressed and there is air flow in the primary circuit but not in the secondary circuit.
Figure 5:
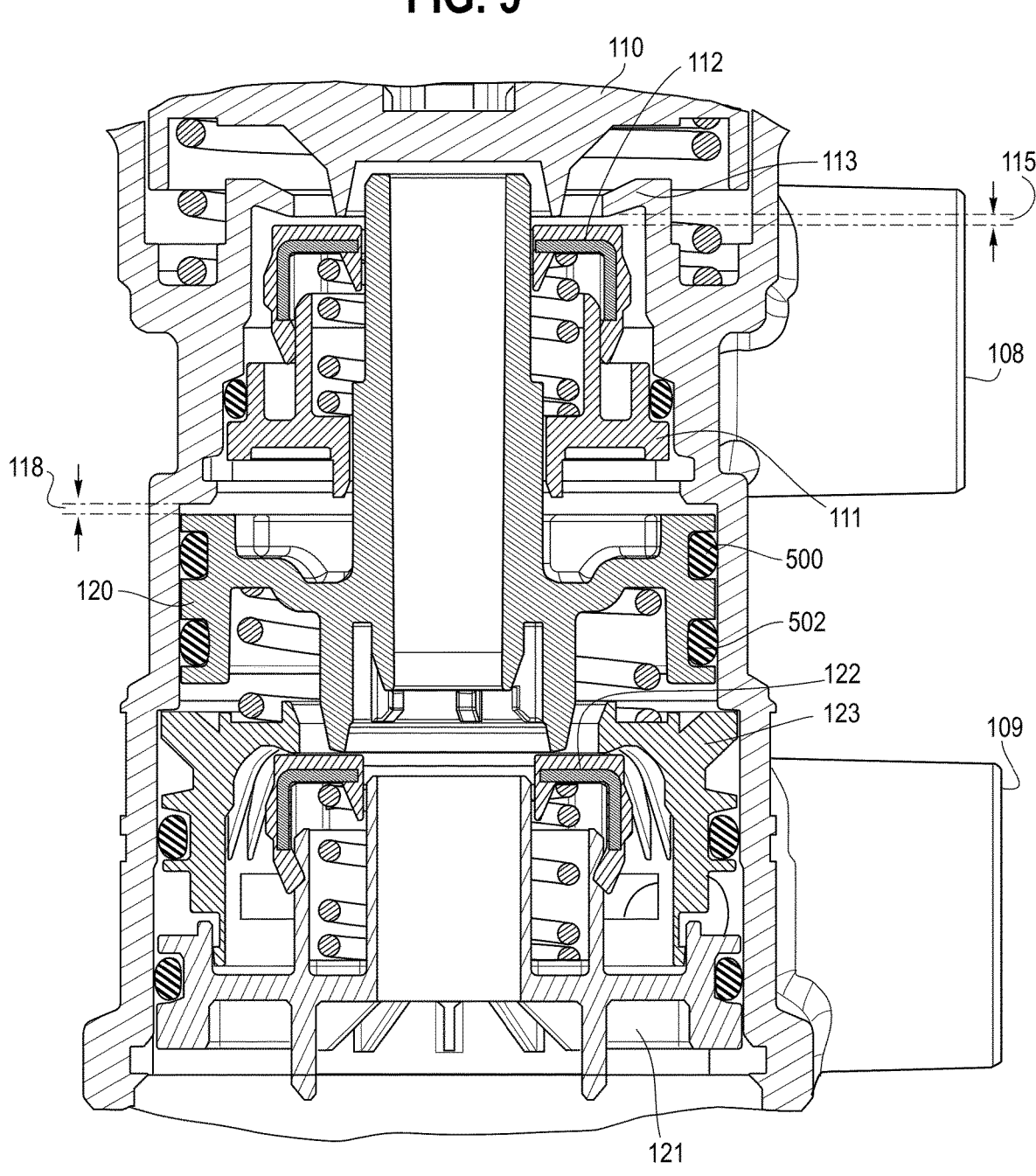
FIG. 5 is an enlarged view of a portion of the foot brake module assembly of FIG. 4.
Figure 6:
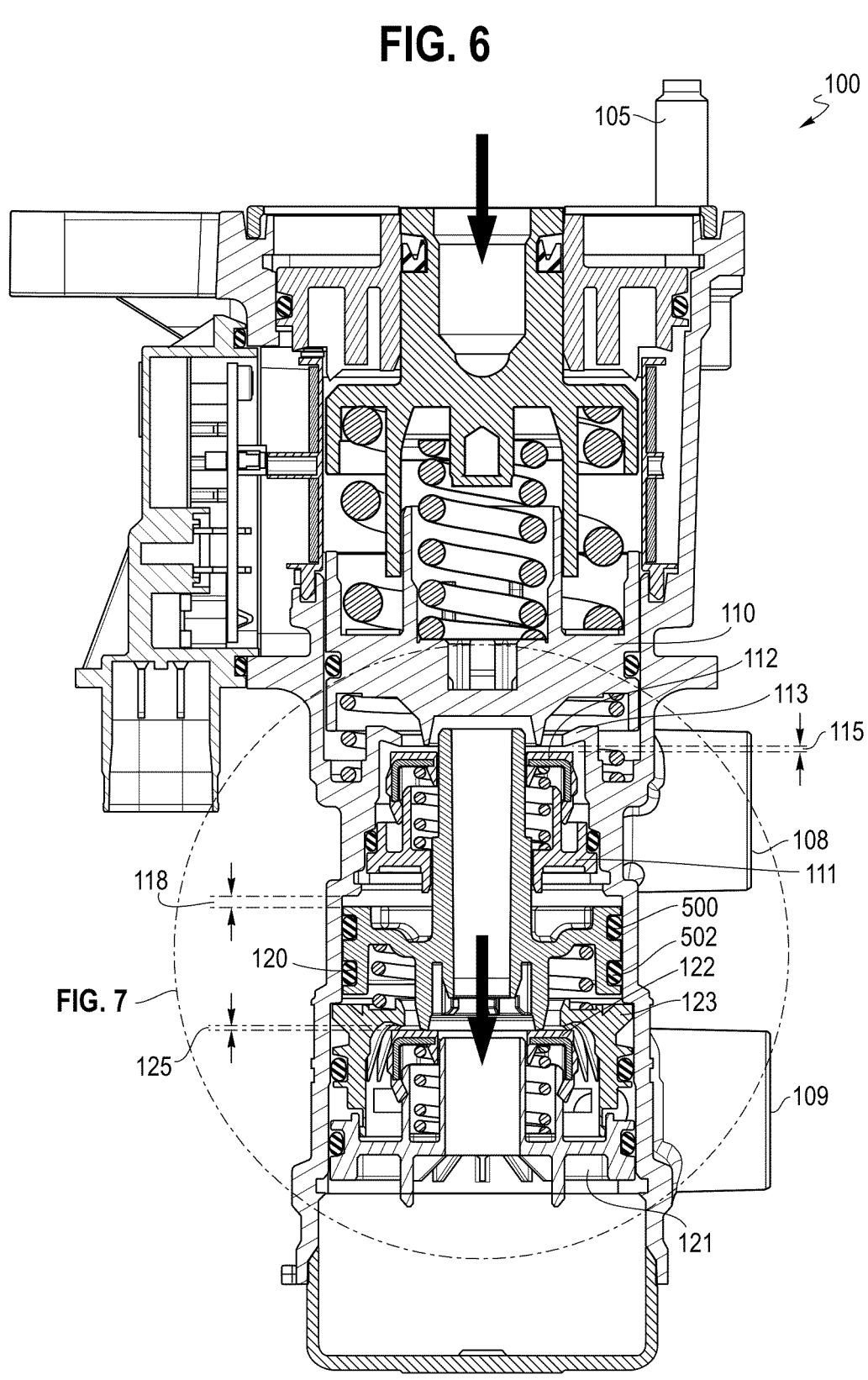
FIG. 6 is a cross-sectional view of FIG. 1 when the foot brake pedal is pressed and there is air flow in both the primary and secondary circuits.
Figure 7:
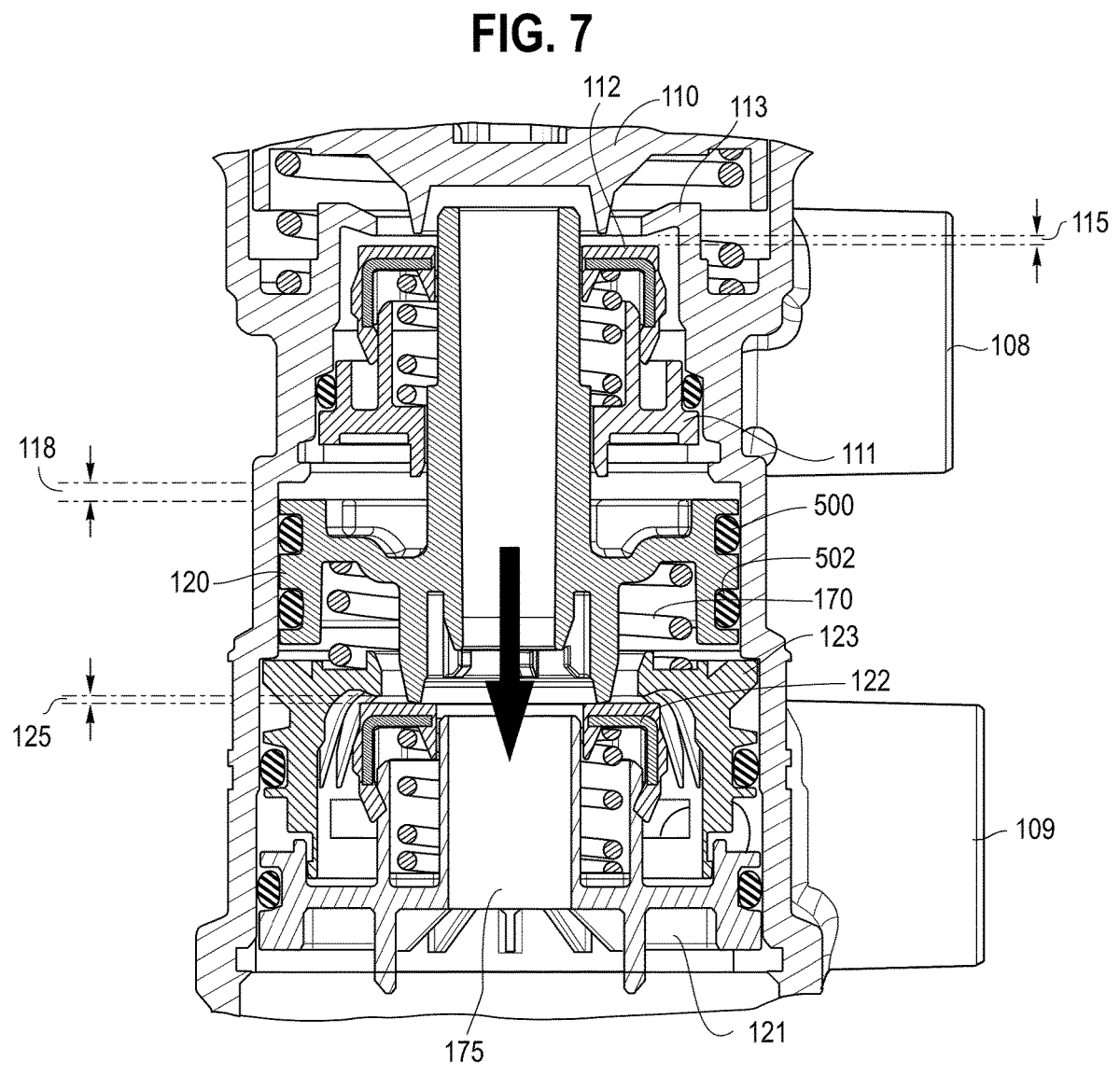

FIGS. 4 and 5 illustrate the operation when the foot brake pedal is pressed and there is air flow in the primary circuit but not in the secondary circuit. As shown in these drawings, when the brake pedal is pressed, force is applied to a thrusting member to move the primary piston 110 downward, which moves the primary valve collar 112 away from the primary valve seat 113. As indicated in FIGS. 4 and 5, this creates an opening 115 for air to flow from the primary supply port 106 to the primary delivery port 108. At this point, the secondary valve collar 122 is still pressed against the secondary valve seat 123, preventing air flow from the secondary supply port 107 to the primary delivery port 109. However, the movement of the primary piston 110 downward also creates an opening 118 through which air from the primary supply port 106 fills the chamber 404 containing the secondary piston 120. As shown in FIGS. 6 and 7, when the pressure in the chamber 404 reaches a threshold, the air in the chamber 404 serves as a pilot to push the secondary piston 120 downward from a first position to a second position, which moves the secondary valve collar 122 away from the secondary valve seat 123. As indicated in FIGS. 6 and 7, this creates an opening 125 for air to flow from the secondary supply port 107 to the secondary delivery port 109, actuating the secondary braking circuit. In one embodiment, the threshold pressure is between about 12 and 17 psi, although it should be understood that higher or lower threshold pressures may be desired and implemented.

In some embodiments, the secondary piston 120 is aligned at the first position in FIG. 3 and realigns itself when it reaches the second position in FIG. 7, but is susceptible to tilting in the "free state" in between the first and second positions. This tilting can be caused by a moment created by a return spring 170 positioned around the secondary piston 120. If the secondary piston 120 tilts too far during its travel, the sealing surface interference, defined for example by the O-ring 502, may be compromised on one side of the secondary piston 120, causing air from the primary and/or secondary supply ports 106, 107 to exhaust through at the bottom of the FBM assembly 100 (i.e., opening up the exhaust path and allowing air flow out the bottom vent), which can be audible. Such tilting may also create wear on the secondary piston 120. To help center the secondary piston 120 as it travels and overcome these problems, the pair of O-rings 500, 502 provides stability, while the relief passages 424, 426 preventing air from being trapped between the O-rings 500, 502 and thereby creating additional friction, while the O-ring 502 continues to function as a sealing member.

Referring again to the valve assembly 601 of FIGS. 16-18, a biased double-check valve ensures that a primary service signal controls the valve. The relay valve assembly 601 may be connected to the FBM assembly 100, or valve assembly 401. In an applied position shown in FIG. 16, a pressurized air supply is delivered to a primary service port 800 and enters the chamber 604 above the piston 720 and moves the piston 720 in the chamber 604. An exhaust seat 802 moves with the piston and seats on the inner or exhaust portion of the inlet/exhaust valve 804, sealing off an exhaust passage 826. At the same time, an outer or inlet portion of the inlet/exhaust valve 804 moves off its seat 806, permitting supply air to flow from a reservoir 808, past the open inlet valve 804 and into one or more service brake chambers 810.

In a balanced position, shown in FIG. 17, the air pressure being delivered by the open inlet valve 804 also is effective on the bottom area of the relay piston. When air pressure beneath the piston equals the service air pressure above, the piston 720 lifts slightly and the inlet spring 812 returns the inlet valve 804 to its seat 806. The exhaust remains closed as the service line pressure balances the delivery pressure. As delivered air pressure is changed, the valve 804 reacts instantly to the change, holding the brake application at that level.

In a relief or exhaust position, shown in FIG. 18, the air pressure is released from the service ports 800, air pressure in the chamber 604 above the relay piston 720 is exhausted through the primary circuit of the brake valve. At the same time, air pressure beneath the piston 720 lifts the relay piston and the exhaust seat 802 moves away from the exhaust valve 804, opening the exhaust passage 824. With the exhaust passage 824 open, the air pressure in the brake chambers is then permitted to exhaust through the exhaust port 826, releasing the brakes.

The pair of O-rings 500, 502 again provide increased stability to the piston 720, while still maintaining an appropriate seal with the O-ring 502 and venting through the relief passages 424, 426 to the chamber.

It should be understood that all of the embodiments provided in this Detailed Description are merely examples and other implementations can be used. Accordingly, none of the components, architectures, or other details presented herein should be read into the claims unless expressly recited therein. Further, it should be understood that components shown or described as being "coupled with" (or "in communication with") one another can be directly coupled with (or in communication with) one another or indirectly coupled with (in communication with) one another through one or more components, which may or may not be shown or described herein.

It is intended that the foregoing detailed description be understood as an illustration of selected forms that the invention can take and not as a definition of the invention. It is only the following claims, including all equivalents, which are intended to define the scope of the claimed invention. Accordingly, none of the components, architectures, or other details presented herein should be read into the claims unless expressly recited therein. Finally, it should be noted that any aspect of any of the embodiments described herein can be used alone or in combination with one another.

What is claimed is:

1. A valve assembly comprising:
a housing comprising an interior wall defining a chamber having a longitudinal axis;
a piston disposed in the chamber and movable between first and second positions along the longitudinal axis, wherein the piston comprises a piston head comprising:
opposite first and second sides;
longitudinally spaced first and second peripheral grooves disposed between the first and second sides, wherein the first and second grooves define a space therebetween; and
a relief passage extending radially inwardly from the first groove and communicating between the space and the first side of the piston; and
longitudinally spaced first and second O-rings disposed in the first and second grooves and engaging the interior wall.

2. The valve assembly of claim 1 wherein the relief passage comprises a first relief passage, and further comprising a second relief passage circumferentially spaced from the first relief passage.

3. The valve assembly of claim 1 wherein the first groove is defined by longitudinally spaced upper and lower walls and a circumferential side wall, wherein the relief passage comprises a continuous undercut formed in the upper and lower walls and the side wall.

4. The valve assembly of claim 3 wherein the upper and lower walls comprise first and second openings defined by the undercut at a circumferential periphery of the piston head.

5. The valve assembly of claim 4 wherein the first and second openings have first and second cross-sectional areas between 0.20 mm$^2$ and 2.00 mm$^2$.

6. The valve assembly of claim 3 wherein the undercut in the side wall has a cross-sectional area of between 0.20 mm$^2$ and 2.00 mm$^2$.

7. The valve assembly of claim 1 wherein the piston comprises a shaft extending from the first side of the piston head, wherein the shaft positioned in a guide sleeve.

8. A foot brake assembly comprising the valve assembly of claim 1, and further comprising:

at least one air supply port; and at least one air delivery port;

wherein the piston is movable between first and second positions to allow air to flow from the air supply port to the air delivery port.

9. The foot brake assembly of claim 8 wherein a first pressure is applied to the first side of the piston and a second pressure is applied to the second side, wherein the first pressure is greater than the second pressure.

10. A relay valve assembly comprising the valve assembly of claim 1 wherein the piston is moveable relative to the housing between an applied position, a balanced position and a release position, wherein the piston comprises a seat engaged with a valve when the piston is in the applied position, wherein the seat is disengaged with the valve when the piston is in the balanced position, and wherein the seat is disengaged from the valve when the piston is in the release position, and wherein the valve is seated against a valve seat when the piston is in the balanced and release positions.

11. A piston comprising:

a piston head comprising:

opposite first and second sides;

longitudinally spaced first and second peripheral grooves disposed between the first and second sides, wherein the first and second grooves define a space therebetween; and a relief passage extending radially inwardly from the first groove and communicating between the space and the first side of the piston; and longitudinally spaced first and second O-rings disposed in the first and second grooves and engaging the interior wall.

12. The piston of claim 11 wherein the relief passage comprises a first relief passage, and further comprising a second relief passage circumferentially spaced from the first relief passage.

13. The piston of claim 11 wherein the first groove is defined by longitudinally spaced upper and lower walls and a circumferential side wall, wherein the relief passage comprises a continuous undercut formed in the upper and lower walls and the side wall.

14. The piston of claim 13 wherein the upper and lower walls comprise first and second openings defined by the undercut at a circumferential periphery of the piston head.

15. The piston of claim 14 wherein the first and second openings have first and second cross-sectional areas between 0.20 mm$^2$ and 2.00 mm$^2$.

16. The piston of claim 13 wherein the undercut in the side wall has a cross-sectional area of between 0.20 mm$^2$ and 2.00 mm$^2$.

17. The piston of claim 11 wherein the piston comprises a shaft extending from one of the first and/or second sides of the piston head.

18. The piston of claim 11 wherein the piston comprises a seat positioned on one of the first and/or second sides of the piston head.

* * * * *